Aug. 6, 1929. S. RUBEN 1,723,525
ELECTRIC CURRENT RECTIFIER
Original Filed June 22, 1925
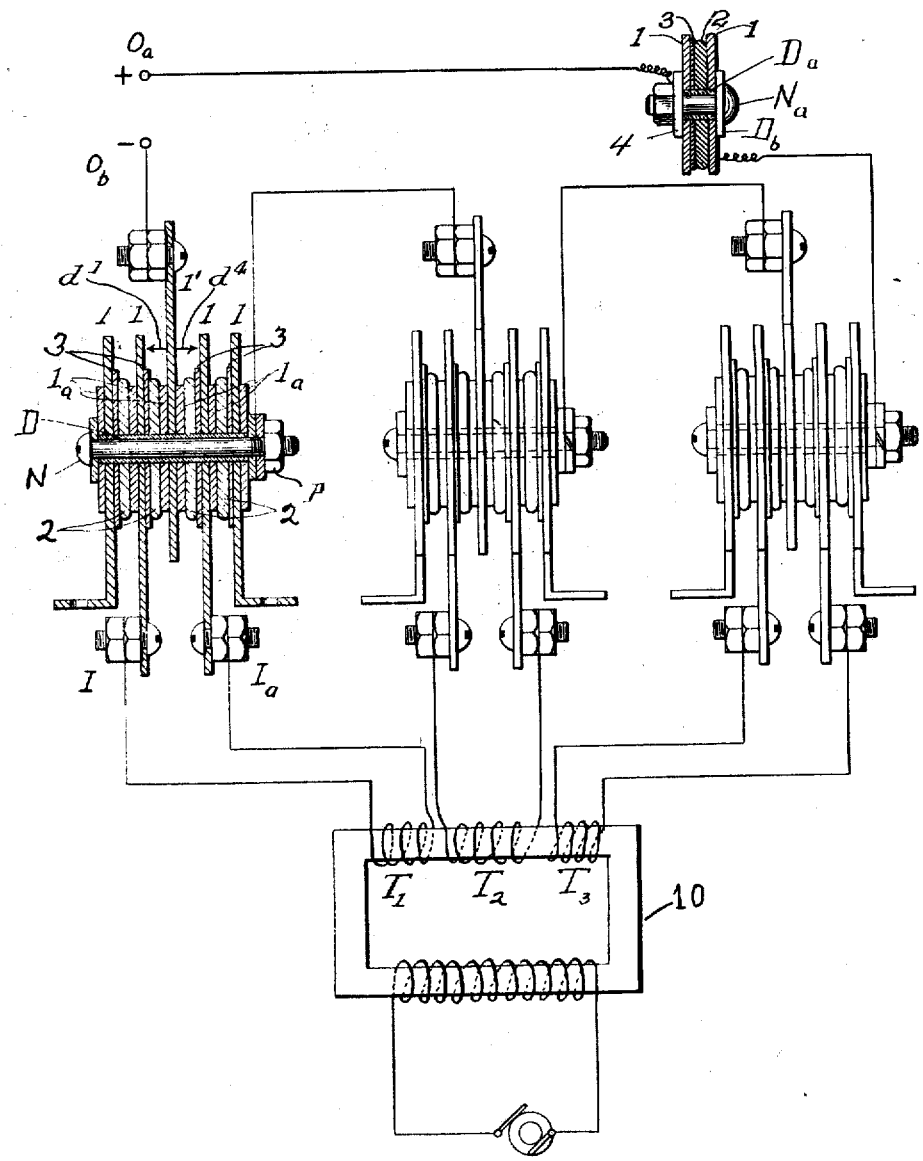
INVENTOR
Samuel Ruben
BY
Mayer, Wargules & Watson
ATTORNEY Patented Aug. 6, 1929.

1,723,525

UNITED STATES PATENT OFFICE.

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE.

ELECTRIC-CURRENT RECTIFIER.

Application filed June 22, 1925, Serial No. 38,780. Renewed May 8, 1929.

This invention relates to electric current rectifiers, and more particularly to electric current rectifiers of the dry surface-contact type which operate by unilateral conduction.

Rectifiers of this type are characterized by the use of a body of relatively electropositive material, employed as one electrode element, disposed in electrical contact with a body of relatively electronegative material employed as the other electrode element. Such rectifiers depend for their operation upon the resistance and current-blocking characteristics of the film which forms at the junction of the electrode elements as the result of electrochemical action. Rectifiers of this character, known prior to my inventions, have been low in efficiency and limited in their application to small currents, becoming unstable after short periods of use.

This invention has for its object generally the provision of a rectifier device of this character which is efficient, economical and readily manufactured.

More specifically its object is to provide a rectifier of the dry surface-contact variety in which the factors heretofore operating to dissipate or entirely nullify the rectifying effect in such rectifying devices, are so balanced and compensated that a uniform rectifying action may be had substantially indefinitely without cessation or diminution.

Another object is to provide a device of this character, which is capable of complete double wave rectification, and is also constructed to withstand imposed electrical and mechanical stresses.

Other objects of the invention will in part be obvious and will in part appear hereinafter.

This application is in part a continuation of my prior applications: No. 739,188 filed September 22, 1924; No. 750,539 filed November 18, 1924; No. 754,956 filed December 10, 1924; No. 155 filed January 2, 1925; No. 13,143 filed March 5, 1925; No. 14,657 filed March 11, 1925.

This application has been divided, the divisional subject matter being claimed in my divisional application, Serial No. 246,256 filed January 12, 1928. My applications, Serial No. 113,009, filed June 1, 1926, and Serial No. 229,362, filed October 28, 1927, are continuations in part of this application.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

The figure is an exemplary view showing, mainly diagrammatically, a rectifying device arranged in accordance with the invention.

The rectifying device here shown is composed of a plurality of asymmetric electric couples, each consisting of a pair of electrode elements, which are mechanically retained between highly conducting elements, for example the copper plates shown at 1 and $1^a$. These electrode elements are of relatively electropositive and electronegative materials and are shown at 2 and 3 respectively; 2 denoting a body of suitable electronegative material, for example a copper compound, such as cupric sulphide; 3 denoting a body of highly electropositive material, for example a relatively highly electropositive metal or metallic compound, such as aluminum, its amalgam, or a thinly coated oxide thereof. These elements are held in assembled relation by means of the insulated bolt N and nut P, the insulating tube shown at D serving to insulate the bolt from the electrode elements but does not insulate the bolt from the end plates.

For rectifying purposes, the asymmetric couples thus provided are formed into units comprising a series of couples. For full wave rectification these units as indicated preferably comprise two groups of series inverted with respect to each other, the groups containing an equal number of asymmetric couples. In this form of device the input terminals are with advantage inserted at intermediate points of each group, for example midway, as shown at I and $I^a$ respectively. The end plates of the groups serve as suitable output terminals. The plate 1' between the two groups in each unit is shown in contact with electropositive elements 3 and is adapted to be connected to the negative terminal of a current-consuming device, here indicated $O_b$. For cimplicity of illustration the output circuit is shown as connected only for half-wave rectification. The positive terminal $O_a$ of the current-consuming device is accordingly connected only to one end plate of a rectifier unit.

In the practice of the invention, it has been observed that the primary cause of the deterioration and destruction of the rectifiers of this type is the intense electrostatic forces generated at the contacting surfaces; even at low voltages these forces physically shatter the rectifying film, composed in the present instance probably of a metallic sulphide. It developed, however, that it is possible to overcome the dynamic effect of those forces by the application of physical pressure and only when over that area there is a layer of a material of specific resistance higher than that of either element. This offers substantially the only method by which the rectifying action may be continued without surface deterioration of the two contacting elements.

Thus, there are two fundamental factors to be supplied: (First) there should be between the rectifying elements, a layer of material having a specific resistance higher than that of either element; and (second) there should be a surface pressure retaining the rectifying elements sufficient to overcome the dynamic effect of the electric field at the junction when passing current.

Accordingly in rectifying devices of the character specified in which the contacting elements are, for example, aluminum and cupric sulphide or zinc and cupric sulphide, intense electric field developed at the junction of the electrode elements, the capacity for current rectification diminishes with the development of a surface reaction product of a relatively non-conductive layer of aluminum (or zinc) and copper oxides, which ultimately reduces the output to a zero value; this effect increases with both the potential impressed and the current density of the current passing, and particularly with the latter. Provision is made for avoiding this destructive effect by applying to the contacting elements a pressure so great as to prevent any electrostatic movement of the surface particles, at the same time effecting a better and more uniform distribution of current and therefore of temperature over the contacting areas. Excessive pressure, however, defeats the purpose and prevents the rectifying action because the specific resistance of the contacting members is so low that the contact drop of potential is insufficient to allow an asymmetrical conductive effect due to the formation and maintenance of a current-blocking film on the contacting surface. This lack of a proper drop of potential is overcome by interposing between those materials a compound having a higher specific resistance than that of either element, preferably a compound of the electropositive material. By the use of this element the pressure can then be carried practically to the limit of the compression strength of the weaker element without affecting the rectification characteristics of the couple. However, the interposed material must not be so thick as to offer too high a resistance and a resultant excessive resistance drop of potential.

In order to obtain a proper drop of potential between the electrode elements, a thin layer of the material having a specific resistance higher than either of the electrode elements may be applied as a thin coating on either of them; this coating material may be, for example, iron sulphide, silver sulphide, or an oxy-compound of one of the electrode elements, particularly a surface oxide or hydroxide. The latter are preferable, but when employed, care should be taken that the layer be very thin and that it be uniformly applied so as to insure a relatively even current distribution over the entire contacting area.

The method preferred for assembling the electrode elements so as to have a proper layer between them consists in disposing adjacently the electropositive body and the electronegative body, placing a thin film of water therebetween, and then applying an alternating current at the normal operating potential to electrolytically decompose the water, causing the formation of an oxide upon the electrode surface. During the formation period mechanical pressure is maintained close to the limit of the compression strength of the weaker element, the pressure being increased according to the varying input current, which is indicative of the formation of the oxide layer. The pressure is increased only as the inverse and leakage current are indicated to be at a minimum. When the couple has been formed, only negligible current flows to it as no load is applied. At this stage, the couple is heated, preferably externally and an alternating current is applied until all the excess water is driven off.

In certain devices of the prior art it was necessary to effect a sparking at the surface of the electrodes by means of a dense current at the surface of the electrodes to effect formation. By the present invention such sparking is unnecessary and there is no physical consumption of the electrode material as by the methods employed in the prior art.

Asymmetric couples of the character provided by the present invention may have voltages continuously impressed thereacross up to a working maximum of approximately 5 volts. Current densities may be employed up to a working maximum of 1 ampere per square centimeter of contacting area. For higher voltages the couples would of course be connected in series. For voltage requiring a large number of couples, the series arrangement is not practical, due to the uneven distribution of potential across the couples which results. The distribution of potential, though it be initially uniform, soon becomes more concentrated across one couple than another in the series, so that arcing occurs. This latter is due apparently to the puncturing of the film that formed between the contacting surface of the electrode elements; the rectifying device in consequence breaks down and becomes inoperative.

To apply current of potentials higher than a single rectifying unit is adapted to withstand, the arrangement illustrated is preferred. Accordingly a plurality of rectifying units are employed, so connected that their output terminals are in series and their input terminals connected with suitable independent sources of alternating current. This is accomplished preferably by the use of a transformer having a separate secondary for each separate rectifying unit to which it is connected. In the drawing there is accordingly shown a transformer 10, having its secondary divided into three parts, namely, $T_1$, $T_2$ and $T_3$, which are respectively connected across the input terminals I and $I^a$ of three series connected rectifying units.

It has been ascertained that when the rectifying units operate under a considerable voltage stress, for example when the voltage of the current-consuming device exceeds that of the rectifying device, a noticeable transitory deterioration in the units will take place. To prevent such deterioration and avoid the stress, there is connected in series with the output circuit, a cut-out having unilateral conductivity; in the preferred form this cut-out consists of an asymmetric couple of this invention. Such a cut-out will function also to block substantially the discharge from a current-consuming device, such as a storage battery in the output circuit, back to the rectifier, in case the alternating current supply is accidentally interrupted. In the drawing the output circuit accordingly shows a cut-out connected in series with the three rectifier units. The cut-out shown comprises contact plates 1, between which are disposed a cupric sulphide plate 2 and an aluminum plate 3 of the character indicated above. The elements are maintained under pressure by bolt $N_a$ insulated by dielectric tube $D_a$ and washer $D_b$ from the other elements except at conducting washer 4.

The cupric sulphide elements which are the electronegative electrode elements here employed are preferably produced by heating copper plates in a non-oxidizing atmosphere charged with sulphur vapor under pressure, to about 800 degrees C. and then reheating them to about the same temperature in air, which heat drives off much of the free sulphur, and plunging them into a chilling bath, preferably water, when a hardening and a recrystallization takes place. Recrystallized cupric sulphide elements withstand the stresses of current discharge better than those not so treated.

In operation, when alternating current is applied respectively across the input electrodes I and $I_a$, current flows in the output circuit only when the aluminum amalgam element is a cathode, i. e. in the direction indicated by arrows $d_1$ and $d_4$; direct current thereupon flowing through the series of rectifying devices, to the output circuit and thence to the terminals $O_a$ and $O_b$.

For the arrangement shown, it will be seen that the resultant secondary voltage from the transformer 10 is distributed in substantially equal portions across the respective input terminals. The output terminals in consequence of this arrangement have a potential which substantially represents the sum of the total portions of input voltage.

The out-put direct current discharges through the cut-out member which blocks any inverse current, thereby relieving the rectifying unit from the stress of any discharges from such a source as a storage battery when its potential is higher than that of the rectifier unit, and particularly when the charging current is interrupted.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In an electrical system adapted for the rectification of alternating current, the combination comprising a single source of alternating current having a plurality of current supply windings, a plurality of unitary groups of asymmetric couples of the dry surface contact variety, said couples in each group being arranged in sub-groups inverted with respect to each other and having input terminals disposed intermediately of said sub-groups, one output terminal being between said sub-groups and a second output terminal connected to an outer end of said sub-groups, alternating current input connections for each group leading from the input terminals thereof to one of said current supply windings, and direct current output connections arranged to connect said output terminals in series in an independent circuit.

2. In an electrical system adapted for the rectification of alternating current, the combination comprising a transformer adapted to be connected to a source of alternating current having a plurality of secondary windings, a plurality of unitary groups of asymmetric couples of the dry surface contact variety, said couples in each group being arranged in sub-groups inverted with respect to each other and having input terminals disposed intermediately of said sub-groups, one output terminal being between said sub-groups and a second output terminal connected to an outer end of said sub-groups, alternating current input connections for each said group leading from the input terminals thereof to one of said secondary windings, and direct current output connections arranged to connect said output terminals in series in an independent circuit.

3. In an electric system adapted for full wave rectification of alternating currents, the combination with a plurality of asymmetric couples of the dry surface-contact variety, disposed in two substantially equal groups and arranged in series, said groups being inverted with respect to each other, of a common output terminal disposed conductively between said groups, a second output terminal comprising terminal plates disposed at the outer ends of said groups, a securing column passing through said couples and plates and arranged to connect electrically said terminal plates, and input terminals disposed intermediately of said groups and asymmetrically disposed with respect to said common output terminal.

4. A rectifying unit of the dry surface-contact variety, comprising a plurality of asymmetric couples arranged in groups, the groups being inverted with respect to each other, said couples being formed respectively of disks of electropositive and electronegative materials, a pair of conducting end plates arranged to provide support for said couples, a securing column passing through said end plates and couples uniting the same under pressure, and a resilient member cooperating with said column and arranged to bear on said couples whereby the same are yieldingly held under pressure.

5. A rectifying unit of the dry surface-contact variety, comprising a plurality of asymmetric couples arranged in groups, the groups being inverted with respect to each other, said couples being formed respectively of disks of electropositive and electronegative materials, a pair of end plates embracing said couples, a conducting bolt having a nut passing through said plates and couples for securing the same together under an operating pressure, insulation surrounding said bolt, and spring washers interposed between an end of said bolt and an end plate for yieldingly maintaining said pressure upon said couples.

In testimony whereof I affix my signature.

SAMUEL RUBEN.

CERTIFICATE OF CORRECTION.

Patent No. 1,723,525.      Granted August 6, 1929, to

SAMUEL RUBEN.

It is hereby certified that error appears in the printed specification of the above numbered patent requiring correction as follows: Page 1, line 110, beginning with the word "For" strike out all to and including the word "unit" in line 5, page 2; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.

terminal connected to an outer end of said sub-groups, alternating current input connections for each group leading from the input terminals thereof to one of said current supply windings, and direct current output connections arranged to connect said output terminals in series in an independent circuit.

2. In an electrical system adapted for the rectification of alternating current, the combination comprising a transformer adapted to be connected to a source of alternating current having a plurality of secondary windings, a plurality of unitary groups of asymmetric couples of the dry surface contact variety, said couples in each group being arranged in sub-groups inverted with respect to each other and having input terminals disposed intermediately of said sub-groups, one output terminal being between said sub-groups and a second output terminal connected to an outer end of said sub-groups, alternating current input connections for each said group leading from the input terminals thereof to one of said secondary windings, and direct current output connections arranged to connect said output terminals in series in an independent circuit.

3. In an electric system adapted for full wave rectification of alternating currents, the combination with a plurality of asymmetric couples of the dry surface-contact variety, disposed in two substantially equal groups and arranged in series, said groups being inverted with respect to each other, of a common output terminal disposed conductively between said groups, a second output terminal comprising terminal plates disposed at the outer ends of said groups, a securing column passing through said couples and plates and arranged to connect electrically said terminal plates, and input terminals disposed intermediately of said groups and asymmetrically disposed with respect to said common output terminal.

4. A rectifying unit of the dry surface-contact variety, comprising a plurality of asymmetric couples arranged in groups, the groups being inverted with respect to each other, said couples being formed respectively of disks of electropositive and electronegative materials, a pair of conducting end plates arranged to provide support for said couples, a securing column passing through said end plates and couples uniting the same under pressure, and a resilient member cooperating with said column and arranged to bear on said couples whereby the same are yieldingly held under pressure.

5. A rectifying unit of the dry surface-contact variety, comprising a plurality of asymmetric couples arranged in groups, the groups being inverted with respect to each other, said couples being formed respectively of disks of electropositive and electronegative materials, a pair of end plates embracing said couples, a conducting bolt having a nut passing through said plates and couples for securing the same together under an operating pressure, insulation surrounding said bolt, and spring washers interposed between an end of said bolt and an end plate for yieldingly maintaining said pressure upon said couples.

In testimony whereof I affix my signature.

SAMUEL RUBEN.

---

CERTIFICATE OF CORRECTION.

Patent No. 1,723,525.             Granted August 6, 1929, to

SAMUEL RUBEN.

It is hereby certified that error appears in the printed specification of the above numbered patent requiring correction as follows: Page 1, line 110, beginning with the word "For" strike out all to and including the word "unit" in line 5, page 2; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.